(12) United States Patent
Chang et al.

(10) Patent No.: US 6,556,313 B1
(45) Date of Patent: Apr. 29, 2003

(54) VECTOR METHOD FOR COLOR MISREGISTRATION DETECTION IN IMAGE DATA

(75) Inventors: William Ho Chang, Vancouver, WA (US); Makoto Otsu, Vancouver, WA (US)

(73) Assignee: Sharp Laboratories of America, Incorporated, Camas, WA (US)

( * ) Notice: Subject to any disclaimer, the term of this patent is extended or adjusted under 35 U.S.C. 154(b) by 0 days.

(21) Appl. No.: 09/405,966

(22) Filed: Sep. 27, 1999

(51) Int. Cl.[7] .................................................. H04N 1/58
(52) U.S. Cl. ...................... 358/1.9; 358/3.26; 358/540; 382/167
(58) Field of Search .................................. 382/162–167; 358/520, 521, 518, 461, 505, 512, 1.9, 3.26, 530, 540; 345/611

(56) References Cited

U.S. PATENT DOCUMENTS

| | | | |
|---|---|---|---|
| 4,583,116 A | 4/1986 | Hennig et al. ................. | 358/75 |
| 5,477,335 A | 12/1995 | Tai ............................... | 358/298 |
| 5,500,746 A | 3/1996 | Aida ........................... | 358/518 |
| 5,737,003 A | 4/1998 | Moe et al. .................... | 347/116 |
| 5,760,815 A | 6/1998 | Genovese .................... | 347/234 |
| 5,764,388 A | 6/1998 | Ueda et al. .................. | 358/529 |
| 5,774,156 A | 6/1998 | Guerin ........................ | 347/116 |
| 5,907,414 A | 5/1999 | Hiratsuka .................... | 358/513 |
| 6,345,117 B2 * | 5/2002 | Klassen ....................... | 382/167 |

* cited by examiner

Primary Examiner—Jon Chang
Assistant Examiner—Colin LaRose
(74) Attorney, Agent, or Firm—Marger Johnson & McCollom, PC

(57) ABSTRACT

A method for color misregistration detection. Input image data is buffered and transferred to vector space. An examination window for a current pixel is established and foreground and background pixels within that window are selected. The current pixel is examined to determine if it is in an edge of a scanned object. If the current pixel is in an edge, it is analyzed for color misregistration. The analysis includes an application of Stokes' theorem. If the results of the application of Stokes' theorem indicate that the color misregistration is above a threshold, the pixel is identified as having color misregistration.

9 Claims, 1 Drawing Sheet

VECTOR METHOD FOR COLOR MISREGISTRATION DETECTION IN IMAGE DATA

BACKGROUND OF THE INVENTION

1. Field of the Invention

This invention relates to methods of image capture, more particularly for methods of detecting color misregistration in image capture devices.

2. Background of the Invention

Color image capture devices typically operate by capturing primary color component signals such as red, green and blue (RGB) from a set of charge coupled devices (CCDs). The CCDs are normally arranged in the sub-scan direction. The main scan direction, the direction in which the scanning bar moves, will be referred to as the X direction and the sub-scan direction, perpendicular to the main scan direction, will be referred to as Y.

These CCDs capture the image in one pass or in three passes, one for each primary color component. Regardless of the number of passes, however, there is typically some misalignment in the RGB signals. This misalignment between colors is referred to as color misregistration. It is caused by faulty superposition of the three colors. It normally manifests itself as color fringes on the edges of the objects that were scanned, either text, graphics or drawings.

Color fringes normally appear as either cyan or magenta fringes on the edges of the scanned objects. Cyan fringes result from misregistration of the red signal, and magenta fringes result from misregistration of the green signal. The human eye does not normally detect misregistration of the blue signal, because of its low bandwidth and low contrast sensitivity.

Most often, color misregistration occurs in the Y direction. Vibration, scanning motion and the mechanical or optical design of the scanner can lead to faulty superposition of the three-color components. Several different approaches have been taken to solve this problem.

For example, some efforts have been directed at correcting the mechanical problems in the scanner by tracking registration marks. One example of these types of techniques is found in U.S. Pat. No. 5,737,003, issued on Apr. 7, 1998. In this patent, a laser scanner used to form latent images on the photoconductive belt is used to detect the position of the edge of the belt. The belt is then controlled to reduce the deviation of the belt from its path. It also includes a method for controlling the laser, and therefore the formation of the image, based upon the position of the belt.

Another of these mechanical registration techniques is found in U.S. Pat. No. 5,774,156, issued Jun. 30, 1998. The system uses several stations, each color of toner. The latent image formed by the individual scanners at the stations includes a registration area. The registration area is then aligned prior to the application of the toner. The registration area is then recharged to avoid having the registration marks attract any toner. This is repeated at each station to ensure proper positioning of the image before the latent image for the next color is formed. U.S. Pat. No. 5,760,815, issued Jun. 2, 1998, shows another method. In this patent, a fiber optic detection means is used to detect registration signals produced by a retroreflector. The light from the retroreflector is analyzed and used to adjust the registration of the belt.

Other methods have focused on optical means to correct the misregistration. An example of these types of techniques can be found in U.S. Pat. No. 4,583,116, issued Apr. 15, 1986. In this patent, the color signals are manipulated to convert them into color separation signals for cyan, magenta, yellow and black. The edges of each of the colors is then detected and manipulated to switch lighter areas with darker areas, or vice versa, to avoid streaks and other imperfections.

Several other types of techniques are used to detect color misregistration at the data level. Examples of these are found in U.S. Pat. Nos. 5,500,746, 5,907,414, 5,477,335, and 5,764,388. In U.S. Pat. No. 5,500,746, issued Mar. 19, 1996, the signals are manipulated to ensure that the dots formed are in line both in the X and Y directions for each color. The dots are resampled and repositioned as determined by line correction devices.

In U.S. Pat. No. 5,907,414, issued May 25, 1999, one of the more powerful prior art methods is shown. An image sensor used to scanning a manuscript generates signals and these signals are examined. If the examination of the signals determines that the pixel exists at an edge of a letter image, it is identified as such. These identified pixels are then adjusted in their brightness to ensure a smooth edge that was disrupted by vibration of the image sensor.

A less sophisticated but still useful technique is shown in U.S. Pat. No. 5,764,388, issued Jun. 9, 1998. In this patent, the cyan-magenta-yellow components of a pixel are analyzed. If the chrominance of the signal is less than a threshold, it is set to zero to offset an assumed color misregistration error.

However, most of these techniques are too expensive or are too inaccurate to meet current expectations for quality. The digital color imaging market has become very competitive. Peripheral image capture and printing devices such as copiers, scanners, digital cameras, fax machines and printers continue to fall in price. Expectations of their quality continue to rise. Therefore, a method is needed that solves color misregistration at low-cost but with high accuracy.

SUMMARY OF THE INVENTION

One aspect of the invention is a method for detecting color misregistration in image data. Input image data is buffered as color space data. The color space data is then transferred to vector space. An examination window around a current pixel is established. Background and foreground pixels in this window are determined. The current pixel is examined to determine if it is on an edge of a scanned object, either text, image or graphic. If the current pixel is on an edge, Stokes' theorem is applied to determine the magnitude of color misregistration. If the magnitude of color misregistration is above a certain threshold, the pixel is identified as having color misregistration.

Other aspects of the invention include the above method with an optional edge detection step that occurs before any detailed analysis is performed. This initial sorting can speed the process by narrowing the number of pixels that need to undergo the detailed analysis.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Vector-based analysis of color misregistration performs color misregistration detection using vector manipulation in RGB color space. However, it is possible that this vector manipulation could be performed in the cyan-magenta-yellow (CMY) or cyan-magenta-yellow-black (CMYK) color space as well. However, as the intent of this invention is analysis upon color capture from an image capture device, and these devices typically use RGB color space, the discussion of this invention will focus on RGB color space. However, that is in no way intended to limit applicability of this invention.

Figure 1:
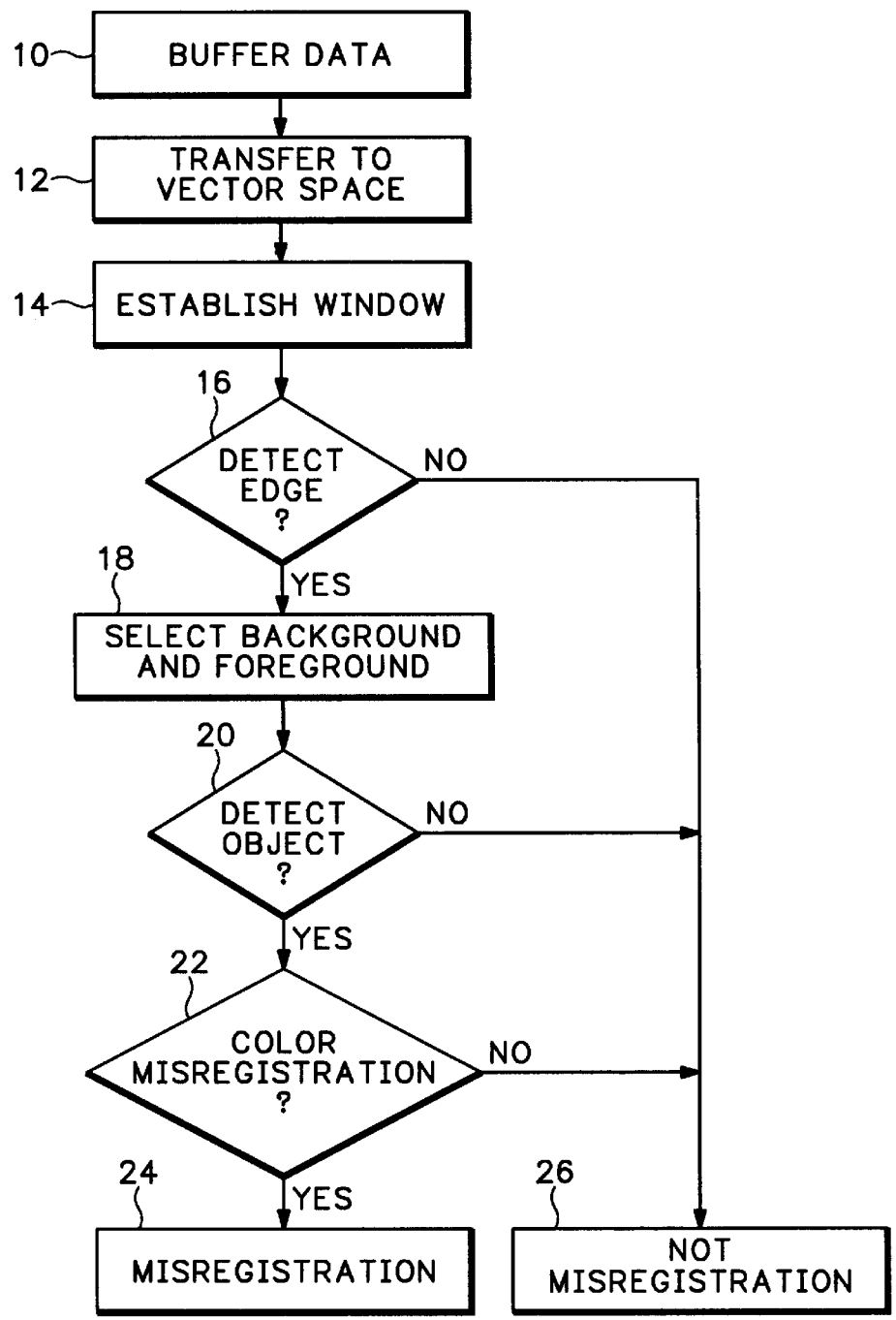
FIG. 1 shows a flowchart of one embodiment of a method for detecting color misregistration in accordance with the invention.

FIG. 1 shows a flow chart of one embodiment of a process for detection of color misregistration in accordance with the invention. In step 10, the input data is received from the color image capture device, typically RGB data. The data is digitized and buffered. For purposes of this discussion, the data is assumed to be digitized at eight bits per color. This data is then processed in RGB vector space in a color misregistration detection circuitry or process. The invention could be implemented as software or in hardware.

In step 12, the line selected in step 10 is then transferred to vector space. The vector space uses two color pixels, which will be referred to as pixel A and pixel B. The two color vectors have the following notation:

$P_A = (R_a, G_a, B_a)$; and $P_B = (R_b, G_b, B_b)$.

The gradient between the two pixels to be $d_{ab} = (d_{RAB}, d_{GAB}, d_{BAB})$, and its magnitude is $D_{AB} = $ magnitude$(d_{AB})$.

Figure 2:
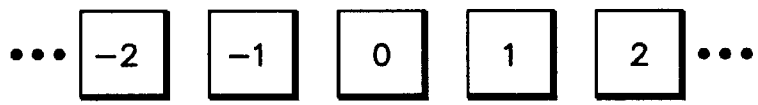
FIG. 2 shows a schematic representation of a pixel layout in the sub-scan direction, in accordance with the invention.

Once the initial data for the RGB color space is buffered and transferred to the vector space, several steps can be performed that will narrow the possible pixels with color misregistration. Prior to performing any of these steps, however, an examination area or window of interest must be established as shown in step 14. The variations of size and direction of this window is left to the designer. For purposes of the discussion only, a window of 5 pixels by 1 pixel will be assumed. A schematic representation of this type of window is shown in FIG. 2.

The pixel of interest is pixel 0. Two pixels on either side, before (−) and after (+) the pixel of interest are used in the analysis. In this example, these 5 pixels are in the sub-scan, or Y, direction. Only one pixel width is used in the scan direction. As has been mentioned, the dimensions of the window are left up to the designer.

Having established the window of pixels to be examined around the pixel of interest, it is now possible to quickly determine whether detailed analysis of that pixel is necessary. In step 16 of the process shown in FIG. 1, the pixel is analyzed to determine whether or not it is on an edge. Edge detection may be performed in many ways. For example, a Sobel filter or a gradient filter may be used.

However, in the instant invention, a special gradient edge detector can also be used. Using the window established in step 16, gradients between the pixel of interest and its neighbors are determined. If the gradients fall below a predetermined threshold, no edge is detected. Since color misregistration typically occurs at the edges of scanned objects, such as text, drawings or images, pixels not on an edge are not considered to be candidates for color misregistration. If the result of edge detection at step 16 is negative, the process continues to step 26 and ends with respect to that pixel.

It must be noted that step 16 performs only an initial determination of edge detection. A much more detailed analysis is performed further in the process. Step 16 is an optional step, which can speed the process by further narrowing the pixels upon which more advanced computations must be performed.

If the result of edge detection in step 16 is positive, the process moves on to step 18 to differentiate between foreground pixels and background pixels. Again, there are several options for this determination. However, for this discussion, one of two approaches will be discussed. The pixels within the window are analyzed to determine darkest or lightest pixels. Alternately, the pixels could be compared against a predetermined pattern. Further in the process, the current pixel will be analyzed in comparison to the foreground and background, so the identification of these components of the image is important.

Once the determination of foreground or background is made, the process moves to object detection at step 20. As discussed above, scanned objects can include text characters, drawings or images. The edges of any of these objects are candidates for color misregistration. Again, there are several methods for determining if a pixel is part of a scanned object or not.

For purposes of this discussion, a two-step method will be used for step 20 of the process. The first step will be to check the gradient of the pixel of interest. To be in the edge of an object, the gradient between the foreground and background must be higher than the gradients between the current pixel and the background, and the current pixel and the foreground. Using D as the magnitude of the gradients, and a and b for foreground and background:

$D(a,b) > D(a,0)$; and $D(a,b) > D(b,0)$.

In addition to the gradient check, a luminance check may also be performed. Some approximation is used to convert the foreground (a), background (b), and current pixel (0) to luminance values. One example of such a conversion is shown below using the foreground values:

$L(a) = 0.5G(a) + 0.3R(a) + 0.2B(a)$.

To be in the edge of an object, the luminance of the current pixel must be between the foreground and background luminance values.

$L(b) < L(0) < L(a)$; or, $L(a) < L(0) < L(b)$.

If the results of this step are positive, and the pixel is in the edge of a scanned object, then the process continues on to step 22. If the results are negative, this pixel is eliminated as a candidate for color misregistration. The process will continue to step 26 and ends with regard to this pixel.

This narrowing process of eliminating pixels that are not good candidates for color misregistration helps speeds the process. Only pixels that are good candidates undergo detailed analysis. This detailed analysis is performed at step 24.

To determine color misregistration, Stokes' theorem is used to calculate the number of color misregistration error present. Stokes' theorem is:

$\iiint \text{curl} G dv = \oiint G n ds$.

Where G is the vector field; v is the volume; n is the vector normal to s; and s is the control surface.

Stokes' theorem is well-known in advanced vector calculus and fluid dynamics and electromagnetics. However, it is not well know in digital color imaging. Essentially, the theorem states that the circulation of the vector field is the integral of the curl over the control volume or region. The net flux of circular gradient over either the same control surface or the control volume is equal to the line integral or surface integral along the contour boundary between the surface or boundary. For color misregistration purposes, Stokes' theorem is zero when no color misregistration has occurred.

One possible application of this theorem can been seen using three pixels assumed to be across an edge in the scanned image. Applying Stokes' theorem would cause computation of the integral of the curl over the region defined by the pixels. The net flux of the circular gradient would then be determined. As mentioned above, if no color misregistration has o the net flux would be zero. Integration across these tree pixels, one firm the background (pixel b), the current pixel (pixel 0) and one from the foreground (pixel a), will result in the following formula:

$$(G_0*B_{ba}+G_b*B_{0a}+G_a*B_{b0})^2+(B_0*R_{ba}+B_b*R_{0a}+B_a*R_{b0})^2+(R_0*G_{ba}+R_b*G_{0a}+R_a*G_{b0})^2<T.$$

If the result of this calculation is high, there is a large amount of color misregistration. If the result is low, there is very little color misregistration. In order to allow dynamic adjustment of the determination of color misregistration or no color misregistration, the result is compared to a threshold value, T. This threshold can be adjusted depending upon the application or the image.

Referring back to FIG. 1, if the result of the calculation is higher than the threshold, there is color misregistration and the process moves to step 24. If the result is lower than the threshold, there is no color misregistration and the process moves to step 26. Once the color misregistration has been detected, it can be adjusted for and mitigated prior to actual rendering of the image. These techniques of mitigating the color misregistration are beyond the scope of this disclosure.

Preferably, the above process is implemented in software in the image capture device. It is possible that it could be implemented in the image output device that receives the image data from the image capture device. It could also be implemented in either part of a device that performs both image capture and image output. This process could be implemented in image or graphic application software, Raster Image Processors (RIP), or printer, copier or output device drivers, among others.

Alternately, the process could be implemented in application specific integrated circuits (ASIC), field programmable gate arrays (FPGA) or in digital signal processors (DSP). However, these hardware implementations are not as flexible, so the software embodiments are preferred.

As mentioned previously, this process could be applied to color spaces other than RGB. It could be implemented in CMY, CMYK and chrominance and luminance based color spaces, such as LAB, LCH, HLS, etc. None of the above specifics or examples are intended to limit applicability of the invention.

Thus, although there has been described to this point a particular embodiment for a method and apparatus for color misregistration detection, it is not intended that such specific references be considered as limitations upon the scope of this invention except in-so-far as set forth in the following claims.

What is claimed is:

1. A method for detecting color misregistration of input images, comprising the steps of:

a) buffering image data received from an image capture device in the form of color space data;

b) transferring said color space data to vector space;

c) establishing a window around and including a current pixel;

d) selecting foreground and background pixels in said window;

e) determining if said current pixel is in an edge of an object; and f) analyzing said pixel by integrating across several pixels in said window to determine if the magnitude of color misregistration exceeds a threshold, if said pixel is in an edge of an object.

2. The method as claimed in claim 1 wherein said method further includes a step of initially determining if a pixel is on an edge, said step occurring between said establishing step and said selecting steps.

3. The method as claimed in claim 1 wherein said establishing step further comprises establishing a window of 5 pixels in the sub-scan direction and 1 pixel in the main scan direction.

4. The method as claimed in claim 1, wherein said determining step further comprises a gradient check and a luminance check on said current pixel.

5. The method as claimed in claim 1, wherein said analyzing step further comprises applying Stokes' theorem to said vector space.

6. The method as claimed in claim 1, wherein said color space is RGB.

7. The method as claimed in claim 1, wherein said color space is CMY.

8. The method as claimed in claim 1, wherein said color space is CMYK.

9. The method as claimed in claim 1, wherein said color space is a luminance and chrominance color space.

* * * * *

UNITED STATES PATENT AND TRADEMARK OFFICE
CERTIFICATE OF CORRECTION

PATENT NO. : 6,556,313 B1
DATED : April 29, 2003
INVENTOR(S) : William Ho Chang et al.

It is certified that error appears in the above-identified patent and that said Letters Patent is hereby corrected as shown below:

Column 1,
Line 54, "stations, each color.." should read -- stations, one for each color --;
Line 61, "color is formed. U.S. Patent" should read -- color is formed. (new paragraph) U.S. Patent --

Column 5,
Line 10, "misregistration has o" should read -- misregistration has occurred, --
Line 11, "across these tree pixels," should read -- across these three pixels, --
Line 11, "one firm the" should read -- one from the --

Signed and Sealed this

Tenth Day of August, 2004

JON W. DUDAS
*Acting Director of the United States Patent and Trademark Office*